United States Patent [19]

Taylor

[11] 3,956,581
[45] May 11, 1976

[54] PICKUP ARM APPARATUS
[75] Inventor: Byron Kent Taylor, Indianapolis, Ind.
[73] Assignee: RCA Corporation, New York, N.Y.
[22] Filed: Nov. 12, 1974
[21] Appl. No.: 522,814

[52] U.S. Cl. .............................. 178/6.6 R; 274/23 R
[51] Int. Cl.² ..................... A63D 15/10; H04N 7/00
[58] Field of Search ..................... 178/6.6 R, 6.6 A; 179/100.4 R, 100.1 B; 274/23 R, 37, 27, 9 R A, 23 A

[56] References Cited
UNITED STATES PATENTS
3,328,037   6/1967   Lehmann et al. ................. 274/23 R Primary Examiner—Vincent P. Canney
Attorney, Agent, or Firm—Eugene M. Whitacre; William H. Meagher; Dilip A. Kulkarni

[57] ABSTRACT

A conductive pickup arm has a first portion and a further portion. One end of the pickup arm first portion is secured to a player supporting structure by a pickup arm support. During playback, (1) the pickup arm first portion is substantially parallel to the turntable surface of the player, and (2) an end of the further portion remote from the pickup arm supported end is disposed near the turntable surface relative to the first portion. A nonconductive signal pickup holder carrying a signal pickup is pivoted to the further portion remote end by a nonconductive signal pickup holder support in a manner that normally disposes the holder axis substantially parallel to the turntable surface. An electrode incorporated in the signal pickup is coupled via the conductive pickup arm to a signal processing circuitry of the player. During playback, the pickup arm further portion positions the signal pickup holder support as near a disc record (disposed on the turntable surface) as practicable in order to reduce the angle subtended between (a) a line joining the signal pickup tip and the signal pickup holder support, and (b) the disc record surface, while reducing the undesirable stray capacitance between the conductive pickup arm further portion and a conductive coating on the disc record.

5 Claims, 3 Drawing Figures

PICKUP ARM APPARATUS

The present invention relates to an improved pickup arm apparatus compatible with mechanical and electrical requirements of a video disc playback system.

BACKGROUND OF THE INVENTION

In certain video disc systems video information is recorded by means of geometric variations in the bottom of a smooth spiral groove on the surface of a disc record. The disc record surface includes a coating of conductive material which is preferably covered with a thin deposit of dielectric material. A signal pickup, supported by a pickup arm, engages the spiral groove and includes a conductive electrode which establishes a capacitance with the conductive coating and the dielectric deposit of the disc record. When the disc record is rotated, the electrode/disc capacitance varies in response to the geometric variations in the bottom of the spiral groove passing beneath. The capacitance variations are converted to electrical variations by a suitable signal processing circuitry coupled to the signal pickup electrode. The output signal of the signal processing circuitry may be coupled to a conventional television receiver for reproduction. The other end of the pickup arm is releasably secured by a coupler to a support member of a supporting structure of the playback system. A system of the aforementioned type is described in detail in the U.S. Pat. No. 3,842,194, issued on Oct. 15, 1974, to J. K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the weight of the pickup arm apparatus, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Stated differently, the position and the angular orientation of the signal pickup electrode in relation to the information track in the spiral groove must be held relatively constant. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the U.S. Pat. No. 3,870,835 issued to F. R. Stave on Mar. 11, 1975 and assigned to the present assignee, for an illustration of a suitable radial feed drive mechanism for providing the indicated radial motion.

Further, in the above-mentioned type video disc systems it has been recognized that the relative motion between the disc record and the signal pickup must be maintained at a predetermined speed, and within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support subject to cyclical, translatory motion along the longitudinal axis of the pickup arm in a manner that opposes deviations of the instantaneous relative speed from the predetermined speed. Illustratively, the means for imparting translatory motion to the support may be of the type disclosed in the U.S. Pat. No. 3,711,641, issued to R. C. Palmer on Jan. 16, 1973, entitled "VELOCITY ADJUSTING SYSTEM", and assigned to the present assignee.

Additionally, in an advantageous pickup arm arrangement for video disc systems of the aforementioned type, the pickup arm is made of conductive material and is enclosed in a conductive cage. The conductive pickup arm and the surrounding conductive cage serve respectively as an inner and outer conductors of an electrical transmission line. The transmission line is capacity end loaded at the pickup arm supported end by a series combination of capacitances which include an air dielectric capacitor and a voltage variable capacitor (for tuning purposes). The transmission line is also capacitor end loaded at the signal pickup end by a combination of capacitances which include the signal pickup electrode/disc record conductive coating variable capacitance. The transmission line and associated capacitances form a tuned circuit with a resonant frequency subject to variations as the signal pickup electrode/disc conductive coating capacitance varies. The tuned circuit is excited with UHF oscillations from a fixed frequency oscillator of the signal processing circuitry operating at a frequency (e.g., 915 MHz) within an ISM-allocated band. As the resonant frequency of the tuned circuit varies, the resultant UHF oscillations amplitude variations are detected by a detector of the signal processing circuitry to recover the prerecorded information. Reference may be made to the U.S. Pat. No. 3,872,240 issued to D. J. Carlson, et al., on Mar. 18, 1975 and assigned to the present assignee, for a more detailed description of the aforesaid transmission line and the associated circuitry.

Thus, in systems of the aforementioned type the pickup arm performs a dual function: (1) it mechanically supports the pickup electrode in signal transfer relation with the disc record during playback, and (2) it forms an electrical transmission line with the surrounding conductive cage so that the prerecorded signals may be recovered. It is advantageous to have a pickup arm which effectively serves the mechanical and electrical functions. First, in connection with the pickup arm's mechanical function, it is desirable to reduce the angle (hereinafter, angle $y$) included between (1) a line joining the signal pickup tip and the effective pivot (for the vertical arcuate motion of the signal pickup in the spiral groove), and (2) the disc record surface, in order to reduce random forward and backward displacement of the signal pickup along the disc record spiral groove as a result of random up and down motion of the signal pickup in the spiral groove (e.g., due to warpage, orange peel, etc.). The random shifting of the signal pickup along the spiral groove results in deleterious fluctuation of relative speed therebetween, thereby causing flickering or jitter of the picture projected on the television screen (which is analogous to "wow" in audio playback systems). In other words, the effective pivot must be as near to the disc record as practicable.

Second, in reference to pickup arm's mechanical function, it is preferable to reduce the distance (hereinafter, distance R) between the effective pivot for the signal pickup and the signal pickup tip for two reasons. One, the smaller the distance R, the smaller is the pickup arm apparatus mass which must follow vertical and lateral motion of the signal pickup in the spiral groove (or in other words, the better is the compliance of the pickup arm assembly). Two, the random, forward and backward displacement of the signal pickup along the spiral groove (for a given angle y) is reduced by reducing the distance R.

Third, in connection with the pickup arm's mechanical function, it is advantageous to dispose the center of gravity of the pickup arm substantially in line with the cyclical, translatory motion of the pickup arm support in order to reduce twisting moments on the pickup arm support when the translatory motion imparting means is activated.

Fourth, in reference to the conductive pickup arm's electrical function, it is desirable that electrical parameters (e.g., reactance) of the transmission line remain substantially free from random variations during playback throughout the range of the translatory motion of the pickup arm for accurate reproduction of the prerecorded signals.

Fifth, in connection with the conductive pickup arm's electrical function, it is advantageous to reduce the undesirable stray capacitance between the disc record conductive coating and the conductive pickup arm portion, adjacent to the signal pickup, in order to prevent interference with the conductive pickup arm's transmission line function.

In a copending application of J. S. Fuhrer, filed concurrently, U.S. Pat. application Ser. No. 522,813, entitled "PICKUP ARM ASSEMBLY", and assigned to the present assignee, a pickup arm arrangement is described. In the Fuhrer arrangement the conductive pickup arm has an intermediate portion interconnecting a first end portion and a second end portion. An end of the first end portion is secured to the player supporting structure so as to dispose (1) both the first and the second end portions parallel to the turntable surface of the player, and (2) the second end portion near the turntable surface relative to the first end portion. A signal pickup holder carrying a signal pickup is pivoted to an end of the second end portion remote from the pickup arm supported end in a manner that normally aligns the axes of the holder and the second end portion.

The present invention is concerned with a modification of the pickup arm assembly of the general form described in the aforesaid Fuhrer application to provide pickup arm apparatus of a modified form which may reduce the undesirable stray capacitance between the disc record conductive coating and the conductive pickup arm portion adjacent to the signal pickup and yet satisfactorily meet other mechanical and electrical requirements set out above.

SUMMARY OF THE INVENTION

A conductive pickup arm has a first portion and a further portion. One end of the pickup arm first portion is secured to a player supporting structure by a pickup arm support. During playback, the pickup arm first portion is substantially parallel to the turntable surface of the player, and (2) an end of the further portion remote from the pickup arm supported end is disposed near the turntable surface relative to the first portion. A nonconductive signal pickup holder carrying a signal pickup is pivoted to the further portion remote end by a nonconductive signal pickup holder support in a manner that normally disposes the holder axis substantially parallel to the turntable surface. An electrode incorporated in the signal pickup is coupled via the conductive pickup arm to a signal processing circuitry of the player. During playback, the pickup arm further portion positions the signal pickup holder support as near a disc record (disposed on the turntable) as practicable in order to reduce the angle subtended between (a) a line joining the signal pickup tip and the signal pickup holder support, and (b) the disc record surface, while reducing the undesirable stray capacitance between the conductive pickup arm further portion and a conductive coating on the disc record.

BRIEF DESCRIPTION OF THE DRAWINGS

Other objects, features, and advantages of this invention will be more fully understood from the following detailed description of the preferred embodiment, the appended claims, and the accompanying drawings in which:

DETAILED DESCRIPTION OF THE PREFERRED EMBODIMENT

Figure 1:
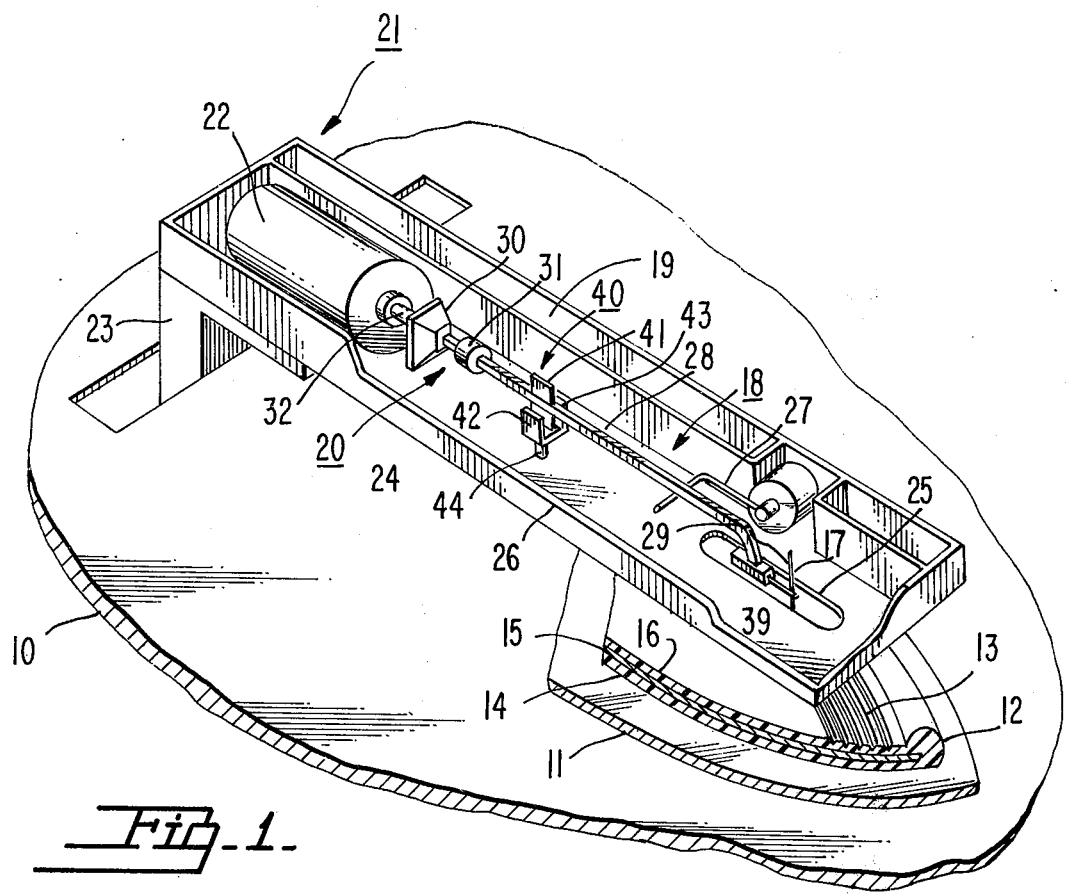
FIG. 1 is a partially cut-away, perspective view of a video disc player incorporating a preferred embodiment of a pickup arm apparatus pursuant to the present invention.
Figure 2:
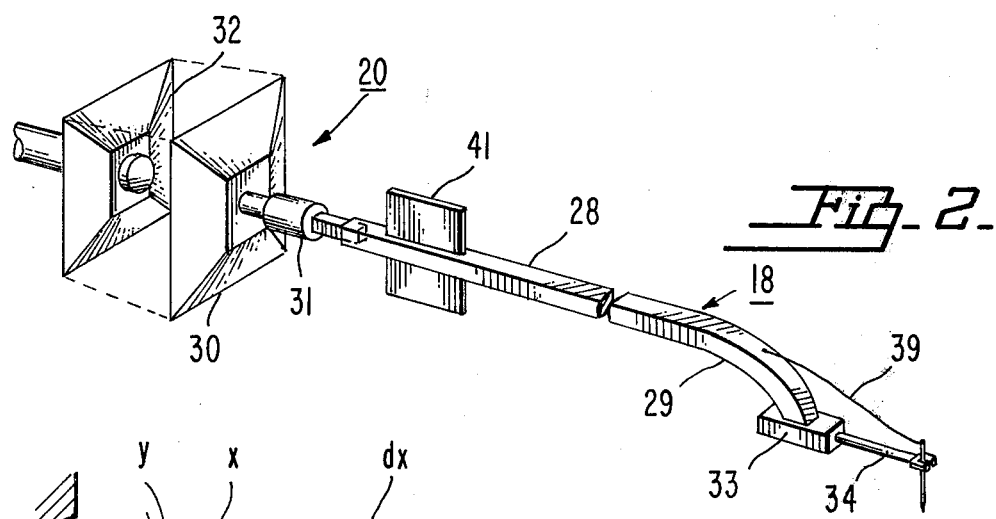
FIG. 2 is an exaggerated, perspective view of the pickup arm apparatus of FIG. 1.

Referring to the drawings, wherein like reference numerals designate similar elements in the various views, in FIGS. 1 and 2 a video disc player is shown having a turntable mounting plate 10. The player is suitable for use in a video disc system such as disclosed in the aforementioned Clemens' patent. A turntable 11 is rotatably mounted on the turntable mounting plate 10. The upper surface of the turntable 11 is adapted to support a video disc record 12. Video information is recorded by means of geometrical variations in the bottom of a smooth spiral groove 13 on a substrate 14 of the disc record 12. The disc record 12 surface includes a conductive coating 15 which is preferably covered with a thin deposit 16 of dielectric material. Although the disc record 12 is shown to have recording on one side only for the purposes of simplicity, it will be seen that the disc record may as well have recording on both sides. A signal pickup 17, supported by a pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral groove passing underneath. The other end of the pickup arm 18 is flexibly and releasably supported by a pickup arm support 20 carried by a pickup arm supporting structure 21 of the player, in the manner to be described subsequently.

The pickup arm supporting structure 21 comprises a radial feed drive mechanism 23 and a translatory motion imparting means 22. As indicated before, the radial feed drive mechanism 23 traverses the pickup arm support 20 in proper time relationship with the radial motion of the signal pickup 17 tip engaged in the spiral groove 13 so as to continuously maintain the longitudinal axis of the pickup arm substantially tangential to the spiral groove at the point of engagement. Reference may be made to the aforementioned copending Stave application (Ser. No. 351,600) for an illustration of a suitable feed drive mechanism for providing the indicated radial motion.

As noted above, the translatory motion imparting means (also known as armstretcher) varies the position of the signal pickup 17 along the disc record spiral groove 13 by imparting cyclical, translatory motion to the pickup arm along its longitudinal axis, via the pickup arm support 20, in a manner that opposes deviations of instantaneous relative speed from a predetermined speed. Illustratively, the translatory motion imparting means may be of the abovementioned Palmer type (U.S. Pat. No. 3,711,641).

A box-like, conductive cage 24 (shown with its lid removed for clarity) is mounted to the supporting structure 21 for enclosing the conductive pickup arm 18. During playback, the pickup arm 18 passes through an opening 25 in a bottom wall 26 of the cage 24 for permitting the signal pickup 17 to ride in the spiral groove 13. A pivotally mounted bracket 27 lifts the free end of the pickup arm 18 to disengage the signal pickup 17 from the spiral groove 13 when the player is inoperative.

The conductive pickup arm has a first portion 28 and a further portion 29 adjacent to the first portion 28. One end of the pickup arm first end portion is yieldably and releasably secured to the translatory motion imparting means 22 by the pickup arm support 20. During playback, (1) the pickup arm first portion 28 is substantially parallel to the turntable 11 surface, and (2) an end of the further portion 29 remote from the pickup arm supported end is disposed near the turntable surface relative to the first portion. Illustratively, the pickup arm support 20 comprises a coupler 30 secured to the pickup arm first portion 28 one end by a compliant member 31. The coupler 30 is subject to releasable engagement with a translatory motion imparting means support member 32. The pickup arm support 20 rigidly transmits the cyclical, translatory motion of the translatory motion imparting means 22 to the pickup arm 18, while accommodating vertical and lateral, arcuate motion of the signal pickup 17 in the spiral groove. Reference may be made to the copending application of B. K. Taylor, et al., filed concurrently, U.S. Pat. application Ser. No. 522,822, entitled "DETACHABLE PICKUP ARM MAGNETIC COUPLING", and assigned to the present assignee, for an illustration of the support member arrangement.

A nonconductive, compliant signal pickup holder support 33 secures a nonconductive signal pickup holder 34, carrying the signal pickup 17, to an end of the pickup arm further portion 29 remote from the pickup arm support 20 in a manner that disposes the holder 34 axis substantially parallel to the turntable 11 surface. The compliant signal pickup holder support 33 also rigidly transmits the cyclical, translatory motion of the pickup arm 18 to the signal pickup holder 34, while accommodating vertical and lateral, arcuate motion of the signal pickup 17 in the spiral groove 13.

The compliant signal pickup holder support 33, being located adjacent to the pickup 17, reduces the pickup arm apparatus mass which must follow the vertical and lateral movement of the signal pickup in the spiral groove 13. The compliant signal pickup holder support 33 accommodates relatively high frequency motion of the signal pickup (e.g., due to orange peel-like rough surface of the spiral groove), while the pickup arm support 20 compliant member 31 accommodates relatively low frequency motion of the pickup (e.g., due to disc mounting eccentricity, warpage, etc.).

Figure 3:
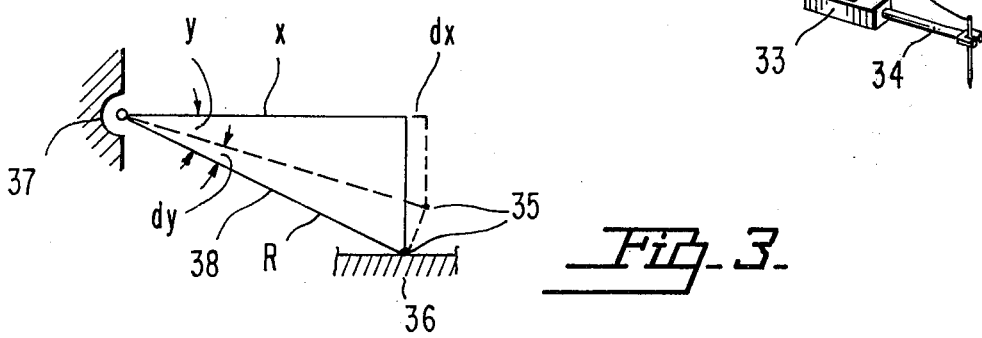
FIG. 3 diagrammatically illustrates horizontal shifting of a signal pickup along a disc record spiral groove as a result of vertical movement of the signal pickup in the spiral groove about a pivot support.

FIG. 3 diagrammatically illustrates horizontal displacement of the signal pickup tip 35 along a disc record spiral groove 36 as a result of vertical movement of the signal pickup in the spiral groove about an effective pivot 37. A line joining the signal pickup tip 35 and the effective pivot 37 is designated by a reference number 38. The line 38 has a length dimension "R" and subtends an angle "$y$" with the horizontal disc record surface 36. A horizontal position "$x$" of the signal pickup tip 36 with respect to the pivot 37 is given by the equation $x = R \cos y$. Therefore, horizontal displacement dx of the signal pickup tip 35 due to vertical movement, which causes a change $dy$ in the angle subtended by the line 38 with the horizontal axis, is given by the equation $|dx| = R (\sin y) dy$. Thus, the signal pickup displacement dx increases with, (1) the angle $y$ for a given dimension R, and (2) the dimension R for a given angle $y$. As noted above, the random displacement of the signal pickup along the spiral groove results in deleterious fluctuation of relative speed therebetween, thereby causing flickering or jitter of the picture projected on the television screen (which is analogous to "wow" in audio playback systems).

An electrode incorporated in the signal pickup 17 is electrically connected to the conductive pickup arm first portion 28 second end by a fly lead 39. The signal pickup electrode is coupled via the fly lead 39 and the conductive pickup arm 18 to the signal processing circuitry 19 in the manner described subsequently.

During playback the pickup arm further portion 29 positions the signal pickup holder support 33 as near the disc record 12 (disposed on the turntable 11 surface) as practicable in order to reduce the angle ($y$) subtended between, ($a$) a line joining the signal pickup 17 tip and the signal pickup holder support, and ($b$) the disc record, while reducing the undesirable stray capacitance between the conductive pickup arm further portion and the disc record conductive coating 15.

The pickup arm first end portion 28 is (1) disposed in registry with the translatory motion imparted to the pickup arm support 20 by the translatory motion imparting means 22, and (2) substantially longer than the remainder of the pickup arm, in order to dispose the center of gravity of the pickup arm substantially in line with the translatory motion thereby reducing twisting moments on the pickup arm support when the translatory motion imparting means is activated.

As indicated above, the conductive pickup arm 18 and the surrounding conductive cage 24 serve respectively as an inner and outer conductors of a transmission line. The transmission line is capacity end loaded at both ends: (1) at the signal pickup 17 end by a variable capacitance corresponding to the series combination comprising (a) the varying capacitance established between the signal pickup electrode and the disc record conductive coating 15, and (b) the larger capacitance exhibited between the bottom of the conductive cage 24 and the disc record conductive coating overshadowed by the cage; and (2) at the pickup arm support 20 end by the series combination including (a) an air dielectric capacitor 40, and (b) the voltage variable capacitor (not shown).

The air dielectric capacitor 40 includes a movable capacitor plate 41, suspended from the pickup arm 18, received in an air gap between a pair of fixed capacitor plates (42 and 43) fixedly mounted to the conductive cage bottom surface 26 by an insulator post 44. The air dielectric capacitor 40 meets the transmission line's capacity end loading requirements without the need for a wired connection between the pickup arm 18 and the cage 24. Ability to quickly and easily remove the replaceable pickup arm unit from the cage is thus established.

The transmission line and the associated capacitances establish a tuned circuit with resonant frequency subject to variation as the signal pickup electrode/disc record conductive coating capacitance varies. The tuned circuit is excited with UHF oscillations from a fixed frequency oscillator (not shown) of the signal processing circuitry 19 enclosed in the cage 24 compartment operating at a frequency (e.g., 915 MHz) within an ISM-allocated band. As the resonant frequency of the tuned circuit varies, the resultant amplitude variations are detected by a detector of a signal processing circuitry 19 to recover the prerecorded information. Reference may be made to the aforementioned, copending Carlson application (Ser. No. 451,103) for a more detailed description of circuitry appropriate to the aforesaid purposes.

The conductive pickup arm first portion 28 is disposed substantially parallel to the conductive cage 24 during playback throughout the range of the translatory motion of the pickup arm in order to reduce random variations in the electrical parameters of the transmission line for accurate reproduction of the prerecorded signals.

The conductive cage bottom surface opening 25 is dimensioned to accommodate the translatory and the arcuate motions of the pickup arm without the contact therebetween. It is desirable to reduce the opening area requirements in order to reduce harmful radiation of the energizing oscillations therethrough. The pickup arm first portion 28 is disposed parallel to the conductive cage bottom surface 26 and the further portion 29 is curved toward the opening 25 whereby the opening area requirements requisite for the motion accommodation are reduced relative to the opening area requirements associated with such motion accommodation for a pickup arm of straight configuration extending from the pickup arm supported end.

Thus, the pickup arm apparatus is provided which, (1) reduces the undesirable stray capacitance between the conductive pickup arm and the disc record conductive coating, (2) reduces the angle subtended between (a) a line joining the signal pickup tip and the signal pickup holder support, and (b) the disc record, thereby reducing deleterious forward and backward displacement of the signal pickup along the disc record spiral groove as a result of up and down motion of the signal pickup in the spiral groove, (3) disposes the center of gravity of the pickup arm apparatus substantially in line with the cyclical, translatory motion of the pickup arm support when the translatory motion imparting means is activated, and (4) reduces undesirable variations in the electrical parameters of the transmission line during playback throughout the range of the translatory motion of the pickup arm.

What is claimed is:

1. In a playback system for recovering prerecorded signals by a signal pickup having a tip subject to engagement with a spirally grooved disc record rotatably mounted on a turntable surface when signal pickup/spiral groove relative speed is established, the disc record surface including a conductive coating covered with a dielectric deposit, wherein the signal pickup includes an electrode which cooperates with disc record conductive coating to form a varying capacitance as the disc record is rotated during playback, and the playback system including a supporting structure and signal processing circuitry, a pickup arm apparatus comprising:

a pickup arm support secured to the supporting structure;
   a conductive pickup arm having a first portion and a further portion, one end of the first portion being secured to the pickup arm support so as to dispose during playback, (a) the first portion substantially parallel to the turntable surface, and (b) an end of the further portion remote from the pickup arm supported end near the turntable surface relative to the first portion;
   means for electrically connecting the signal pickup electrode to the conductive pickup arm first portion second end;
   a nonconductive signal pickup holder holding the signal pickup at one end; and
   a nonconductive and compliant signal pickup holder support for securing the signal pickup holder second end to the further portion remote end in a manner that normally disposes the holder axis substantially parallel to the first portion of the pickup arm, and at an angle to the axis of the further portion at the remote end.

2. A system as defined in claim 1 wherein the supporting structure includes translatory motion imparting means for varying the position of the signal pickup along the spiral groove in a manner that opposes deviations of the relative speed from a predetermined speed, wherein the pickup arm support is subject to engagement with the translatory motion imparting means when the pickup arm apparatus is in an assembled condition, and wherein the pickup arm first portion is (1) disposed in registry with the translatory motion of the pickup arm support, and (2) substantially longer than the remainder of the pickup arm, in order to reduce twisting moments on the pickup arm support when the translatory motion imparting means is activated.

3. A system as defined in claim 2 wherein the conductive pickup arm is enclosed in a conductive cage, wherein the conductive pickup arm and the surrounding conductive cage serve respectively as an inner and outer conductors of a transmission line, wherein the transmission line and the varying capacitance establish a tuned circuit, wherein during playback the tuned circuit is excited with energizing oscillations and response thereof is detected for recovering the prerecorded signals by the signal processing circuitry, and wherein the first portion of the conductive pickup arm is disposed substantially parallel to the conductive cage during playback, throughout the range of the translatory motion of the pickup arm, in order to reduce random variations in the electrical parameters of the transmission line for accurate reproduction of the prerecorded signals.

4. A system as defined in claim 2 wherein the pickup arm support rigidly transmits the translatory motion of the translatory motion imparting means to the pickup arm while accommodating vertical and lateral arcuate motion of the signal pickup in the spiral groove.

5. A system as defined in claim 4 wherein the signal pickup holder support also rigidly transmits the translatory motion of the pickup arm to the signal pickup holder while accommodating vertical and lateral arcuate motion of the signal pickup in the spiral groove, and wherein the accommodation of the vertical and lateral motion of the signal pickup by the signal pickup holder support reduces the pickup arm apparatus mass which must follow the vertical and lateral motion thereby reducing the mechanical impedance presented by the signal pickup to the disc record spiral groove.

* * * * *